US010308269B2

(12) United States Patent
Bacallao et al.

(10) Patent No.: US 10,308,269 B2
(45) Date of Patent: Jun. 4, 2019

(54) SHOPPING CART WITH SENSOR SYSTEM

(71) Applicant: Walmart Apollo, LLC, Bentonville, AR (US)

(72) Inventors: Yurgis Mauro Bacallao, Centerton, AR (US); Joshua David Osmon, Bentonville, AR (US)

(73) Assignee: WALMART APOLLO, LLC, Bentonville, AR (US)

( * ) Notice: Subject to any disclaimer, the term of this patent is extended or adjusted under 35 U.S.C. 154(b) by 0 days.

(21) Appl. No.: 15/969,891

(22) Filed: May 3, 2018

(65) Prior Publication Data
US 2018/0354540 A1    Dec. 13, 2018

Related U.S. Application Data

(60) Provisional application No. 62/517,012, filed on Jun. 8, 2017.

(51) Int. Cl.
*B62B 3/02*    (2006.01)
*B62B 5/00*    (2006.01)
(Continued)

(52) U.S. Cl.
CPC ............ *B62B 5/0096* (2013.01); *B62B 3/002* (2013.01); *B62B 3/02* (2013.01); *B62B 3/1472* (2013.01);
(Continued)

(58) Field of Classification Search
CPC ..... B62B 5/0096; B62B 2203/50; B62B 3/14; B62B 3/02; B62B 3/002; B62B 3/1472;
(Continued)

(56) References Cited

U.S. PATENT DOCUMENTS 3,836,755 A  *  9/1974  Ehrat .................. G06Q 20/343
                                                    177/25.15
4,071,740 A  *  1/1978  Gogulski ........... G06K 7/10861
                                                    186/61
(Continued)

FOREIGN PATENT DOCUMENTS

CN        203126906 U     8/2013
WO        2010144054 A1   12/2010

OTHER PUBLICATIONS

Gutsche, Jeremy "Self-Serve Checkouts are Taken a Step Further," TrendHunter.com, Jan. 21, 2007.
(Continued)

*Primary Examiner* — Bryan A Evans
(74) *Attorney, Agent, or Firm* — Schmeiser, Olsen & Watts LLP

(57) ABSTRACT

A shopping cart with sensor system is used by customers of a retail store to collect and scan items to be purchased. The shopping cart with sensor system includes a shopping cart and a shopping cart sensor system. Items to be purchased are placed in the shopping cart, where they are automatically scanned by the sensor system. The shopping cart sensor system includes a frame and a sensor coupled to the frame. The frame rotates with respect to the shopping cart so that the sensor can collect product information from items in the shopping cart. A first and a second light bar and a microcomputer are also coupled to the frame. The product information is used to ring up the items a customer wishes to purchase, so the customer does not have to visit a checkout station to have their items rung up.

19 Claims, 13 Drawing Sheets

(51) Int. Cl.
  *G06Q 30/06* (2012.01)
  *B62B 3/00* (2006.01)
  *F21V 33/00* (2006.01)
  *B62B 3/14* (2006.01)
  *F21S 4/00* (2016.01)
  *F21V 23/06* (2006.01)

(52) U.S. Cl.
  CPC ............... *F21S 4/00* (2013.01); *F21V 23/06* (2013.01); *F21V 33/00* (2013.01); *G06Q 30/0633* (2013.01)

(58) Field of Classification Search
  CPC . F21S 4/00; F21V 23/06; F21V 33/00; G06Q 30/0633
  See application file for complete search history.

(56) References Cited

U.S. PATENT DOCUMENTS

| | | | |
|---|---|---|---|
| 4,156,318 A | | 5/1979 | Economy |
| 5,424,524 A | | 6/1995 | Ruppert et al. |
| 5,495,097 A | | 2/1996 | Katz et al. |
| 5,898,158 A | * | 4/1999 | Shimizu ............. G01G 19/4144 186/61 |
| 6,168,079 B1 | | 1/2001 | Becker et al. |
| 6,484,939 B1 | | 11/2002 | Blaeuer |
| 6,910,697 B2 | * | 6/2005 | Varatharajah ............. B62B 3/14 235/383 |
| 7,895,777 B2 | | 3/2011 | Crum |
| 7,934,647 B1 | * | 5/2011 | Mims .................... B62B 5/0096 235/383 |
| 7,953,606 B2 | * | 5/2011 | Shirasaki ............. G06Q 20/204 280/33.991 |
| 8,215,650 B2 | | 7/2012 | Arceta et al. |
| 8,464,945 B2 | * | 6/2013 | Connelly ................ B62B 3/148 235/375 |
| 8,564,401 B2 | | 10/2013 | Padgett et al. |
| 9,230,249 B1 | | 1/2016 | Vora |
| 2004/0249717 A1 | * | 12/2004 | Shirasaki ............. G06Q 20/204 705/17 |
| 2008/0308630 A1 | * | 12/2008 | Bhogal .................. G06Q 30/02 235/383 |
| 2009/0106085 A1 | * | 4/2009 | Raimbeault .......... G06Q 20/208 705/14.44 |
| 2018/0370554 A1 | * | 12/2018 | Raza .................... B62B 5/0096 |

OTHER PUBLICATIONS

Gunther, Melanie "The little something extra for shopping carts," iXtenso.com, Jan. 8, 2016.

Notice of Allowance in U.S. Appl. No. 15/969,899, dated Jan. 15, 2019; 10 pages.

* cited by examiner

SHOPPING CART WITH SENSOR SYSTEM

CROSS REFERENCE TO RELATED APPLICATION

This invention claims priority to U.S. provisional patent application Ser. No. 62/517,012 filed Jun. 8, 2017 entitled "Shopping Cart with Sensor System", which is incorporated entirely herein by reference.

BACKGROUND OF THE INVENTION

Technical Field

This invention relates to scanners for obtaining product information from retail products being sold, and specifically to a sensor system that attaches to a shopping cart to scan the products in the shopping cart.

State of the Art

Electronic scanners are used at checkout stations in retail stores to electronically collect the price and product information of products that are being purchased by a customer. The scanner can be any one of several types of sensors, such as a bar code scanner that reads a bar code on the product. The product price is used to tabulate a total amount owed by a specific customer. The product information is used by the retail store to keep track of what products are being purchased. The trend in retail stores is to move away from using fixed checkout stations that customers visit to pay for their purchases. Trends in product purchase are moving towards customers scanning their own purchases and paying for them electronically, without visiting a checkout station in the retail store. Some stores distribute scanners to their customers to scan each product as it is put in the shopping cart, or let the customers use their own mobile computing device to scan the products as they are put in the cart. This method requires the customer to physically scan each item, however, which can be tedious for the customer and can result in errors. It is desirable to have a sensor system that mounts to a shopping cart and automatically scans items in the shopping cart. Ideally, the sensor would be mounted to the shopping cart such that the scanning would be done without customer input.

Accordingly, what is needed is a shopping cart sensor system that mounts to a shopping cart to automatically scan and collect product information from items in a shopping cart.

DETAILED DESCRIPTION OF EMBODIMENTS OF THE INVENTION

Figure 1:
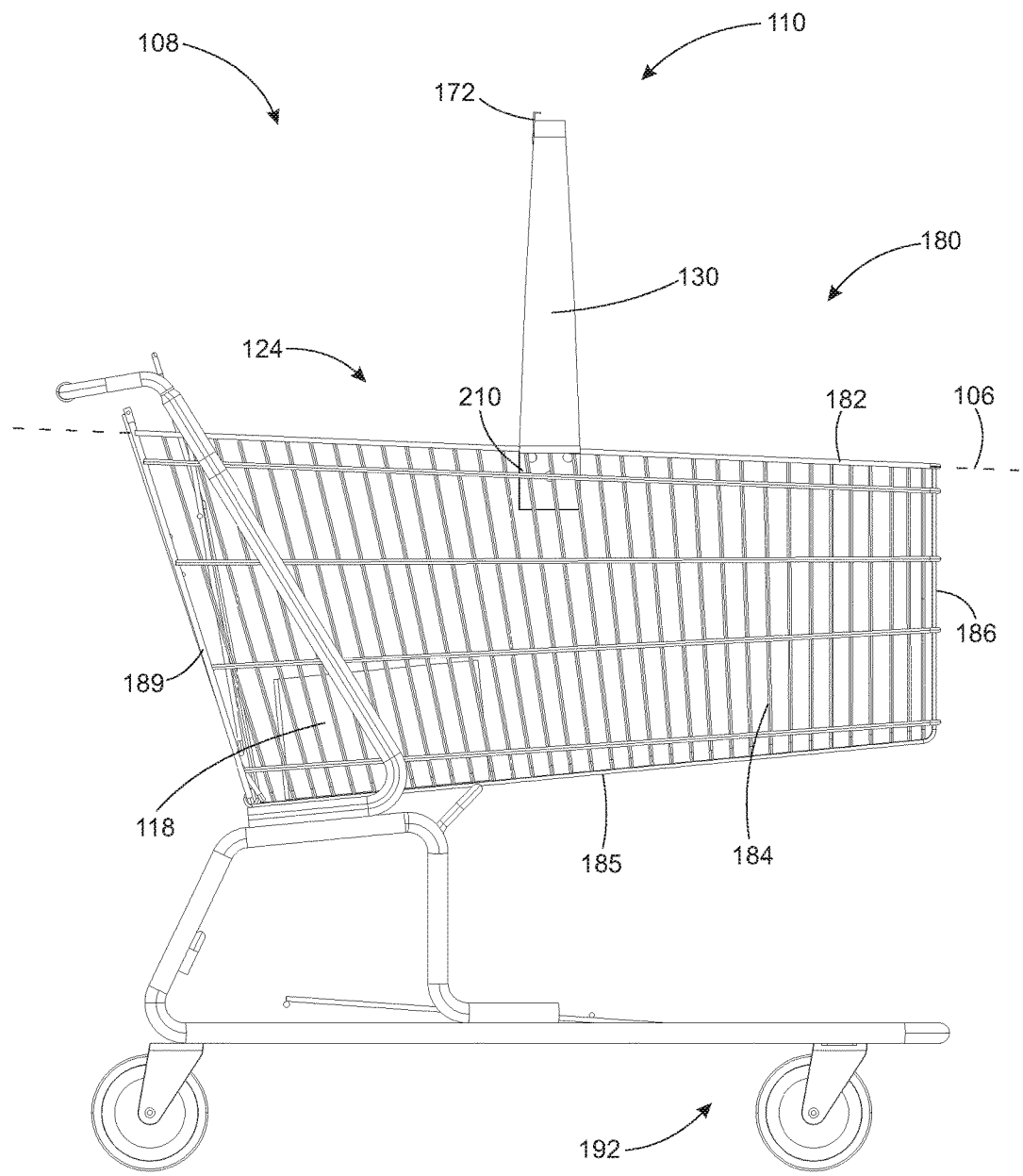
FIG. 1 shows a side view of a shopping cart with a shopping cart sensor system.

As discussed above, embodiments of the present invention relate to scanners for obtaining product information from retail products being sold, and specifically to a sensor system that attaches to a shopping cart to scan the products in the shopping cart.

A checkout station is a location in a retail store where customers bring their items they wish to purchase. The items to be purchased are "rung up" and bagged at the checkout station. Electronic sensors such as scanners or image sensors are routinely used at checkout stations to collect the price and product information from products to be purchased. The price is used to add up the total amount of payment due from the customer. Product information is collected and used by the store to track inventory, for example, as well as to collect and analyze information about which products are being sold and who is buying them. Checkout stations are equipped with electronic sensors to collect this product information quickly and easily. Laser scanners are a common type of sensor used at checkout stations to scan a bar code on the product, but an electronic sensor can use many different types of technology to scan a product. Electronic sensors can use lasers or image sensors to capture barcode or QR code information, for example. An image sensor can capture a picture of the product to identify it. Alternatively, electronic sensors can obtain product information using electronic communication with a tag or device on the product, which can include any type of electronic communication between the sensor and the product, where the communication is wired or wireless.

The trend in retail stores is for customers to handle their own checkout tasks without help from retail store employees. Self-checkout stations have electronic sensors that customers can use to scan their products and checkout by themselves. However, this still requires the customer to go to a self-checkout station and use the sensor located at the self-checkout station. To make checkout even easier, some stores are having customers scan their items as they collect them in their shopping cart. The customer can either borrow a hand-held scanner from the retail store, or use their own smart phone or other mobile computing device to scan each device as it is placed in the shopping cart. The next step in making self-checkout easy is to implement a sensor mounted to the shopping cart which automatically scans products as they are put in the shopping cart. This relieves the customer of having to individually scan each product.

Disclosed herein is a shopping cart with a shopping cart sensor system. The shopping cart with shopping cart sensor system is used by customers of a retail store to collect and scan items to be purchased. Items to be purchased are placed in the shopping cart, where they are automatically scanned by the shopping cart sensor system. The customer does not need to individually scan by hand each item in the cart. Once the customer is completed gathering items to be purchased, they can electronically pay for the items and leave the retail store. The shopping cart with shopping cart sensor system includes a shopping cart and a shopping cart sensor system coupled to the shopping cart. The shopping cart sensor system scans, or senses, products that are in the shopping cart.

Also disclosed is a shopping cart sensor system that 'scans'—obtains product information from—products in a shopping cart. The shopping cart sensor system is coupled to the shopping cart. The shopping cart sensor system includes a frame coupled to the shopping cart, and a sensor, a microcomputer, and a battery pack coupled to the frame. The sensor obtains product information from the products in the shopping cart. The frame mounts the sensor to the shopping cart. In some embodiments, the frame is rotatably coupled to a top rail of the shopping cart. The shopping cart sensor system can also include a light bar coupled to the frame. The light bar is used to illuminate the products for scanning. The light bar can display different combinations of lights and colors to show the status of the shopping cart sensor system.

Figure 2:
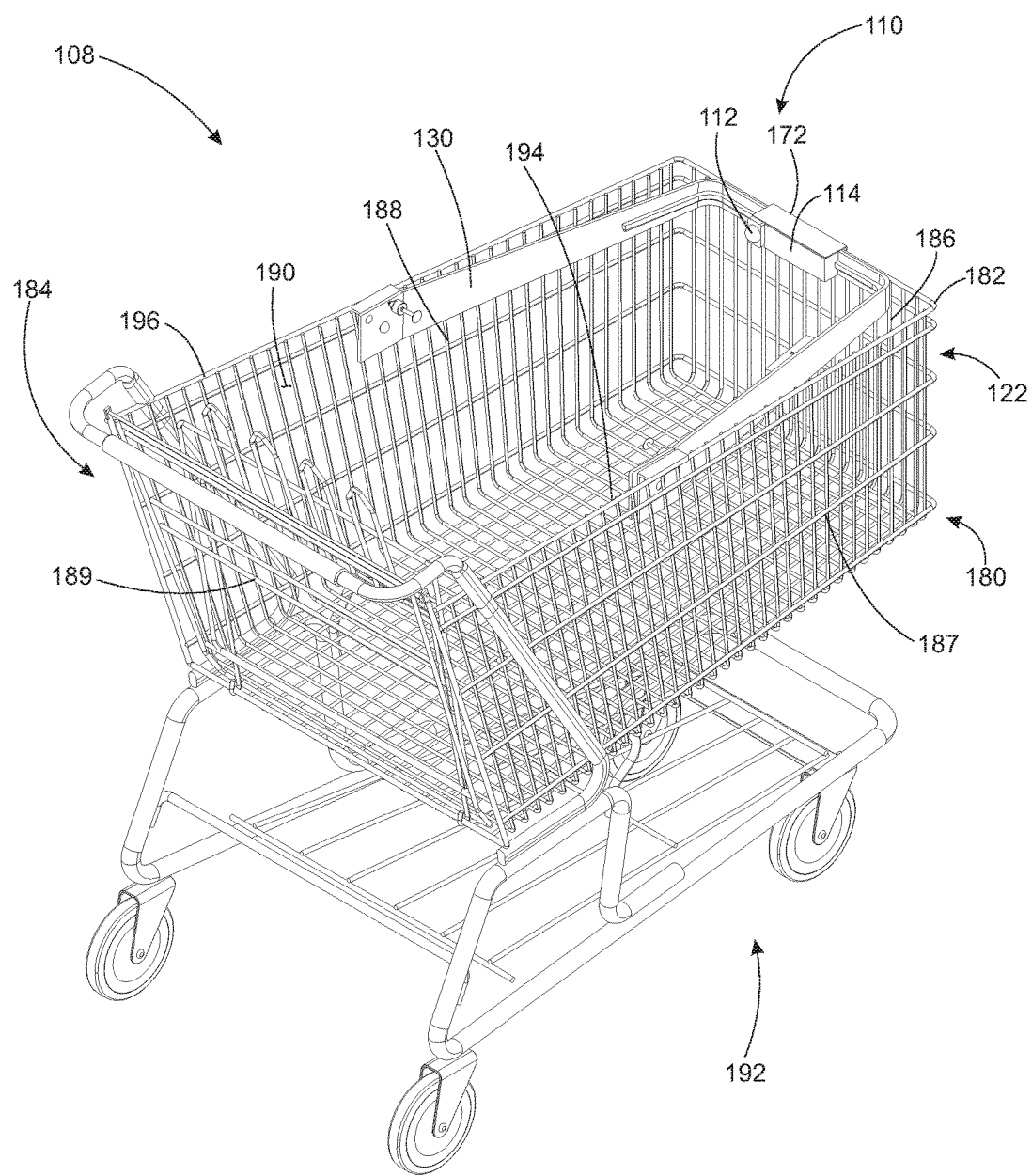
FIG. 2 shows a top perspective view of the shopping cart with a shopping cart sensor system of FIG. 1 with a frame of a shopping cart sensor system in a first position.
Figure 3:
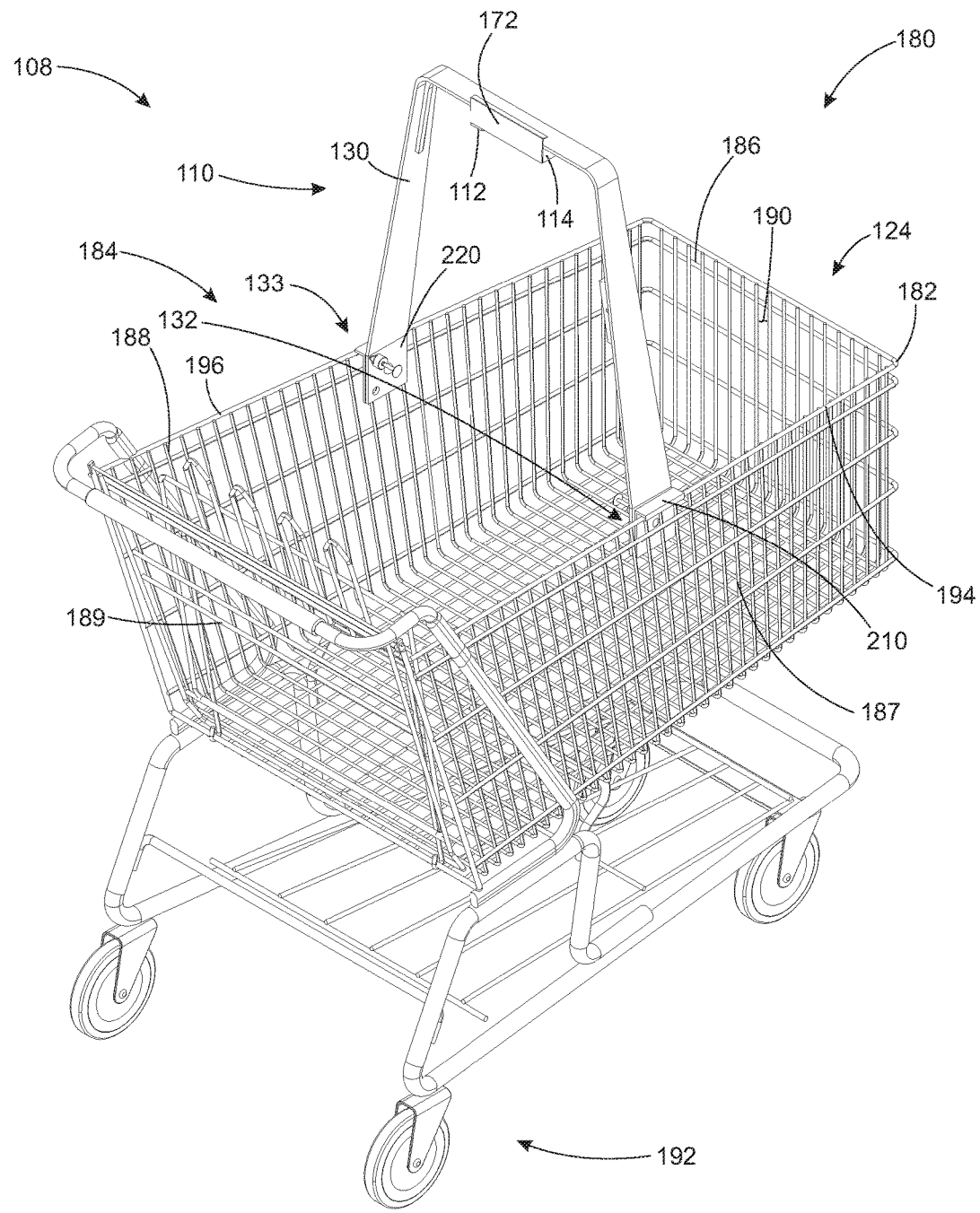
FIG. 3 shows a top perspective view of the shopping cart with a shopping cart sensor system of FIG. 1 with a frame of the shopping cart sensor system in a second position.

FIG. 1 through FIG. 3 show a shopping cart with shopping cart sensor system 108. Shopping cart with shopping cart sensor system 108 includes a shopping cart 180 and a shopping cart sensor system 110 coupled to shopping cart 180. FIG. 1 shows a side view of shopping cart with shopping cart sensor system 108. FIG. 2 shows a perspective view of shopping cart with shopping cart sensor system 108. FIG. 3 shows another perspective view of shopping cart with shopping cart sensor system 108. FIG. 2 shows shopping cart sensor system 110 with a frame 130 of shopping cart sensor system 110 in a first position 122. In first position 122, frame 130 lies in or approximately parallel to a plane 106 (see FIG. 1) of a top rail 182 of shopping cart 180. FIG. 1 and FIG. 3 shows shopping cart sensor system 110 with frame 130 of shopping cart sensor system 110 in a second position 124. In second position 124, frame 130 is approximately perpendicular to plane 106 (see FIG. 1) of top rail 182 of shopping cart 180. Frame 130 is coupled to shopping cart 180 like a handle of shopping cart 180, with frame 130 being able to rotate with respect to shopping cart 180, where the rotation includes first position 122 and second position 124.

Figure 4:
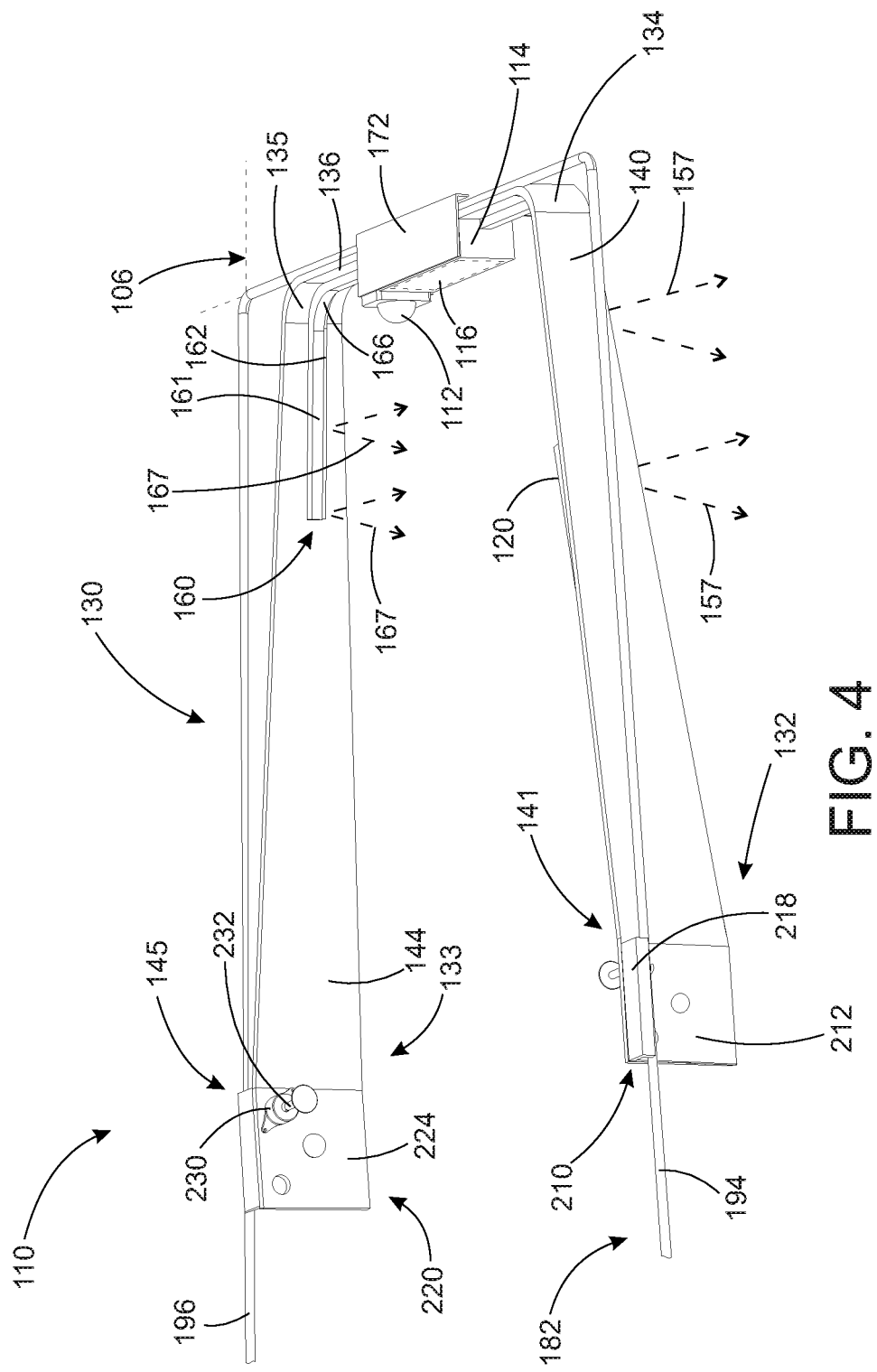
FIG. 4 shows a top perspective view of the shopping cart with a shopping cart sensor system of FIG. 1, with the frame in the first position and coupled to a top rail of the shopping cart, with the remainder of the shopping cart not shown for simplicity.
Figure 5:
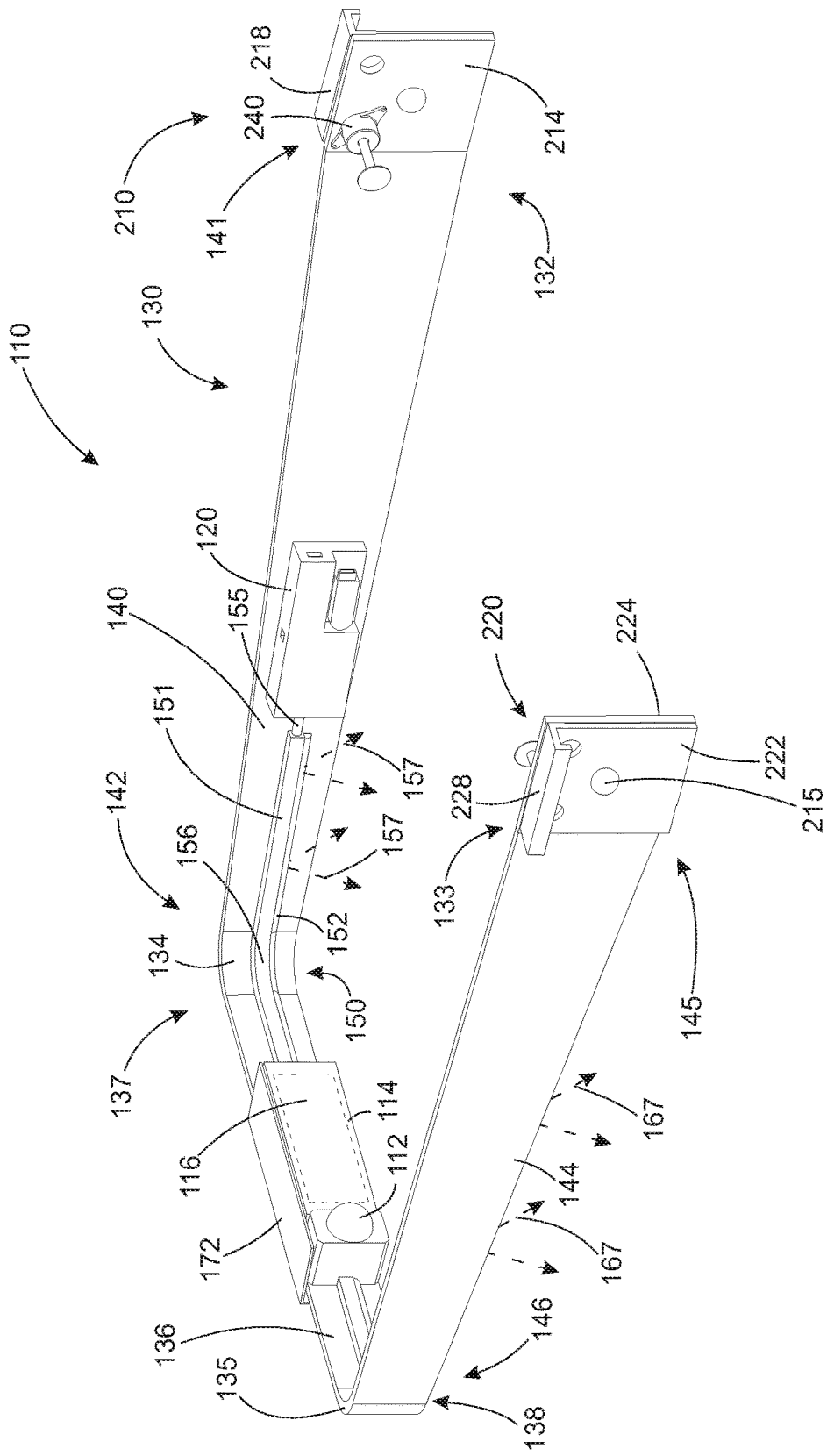
FIG. 5 shows a top perspective view a shopping cart sensor system.
Figure 6:
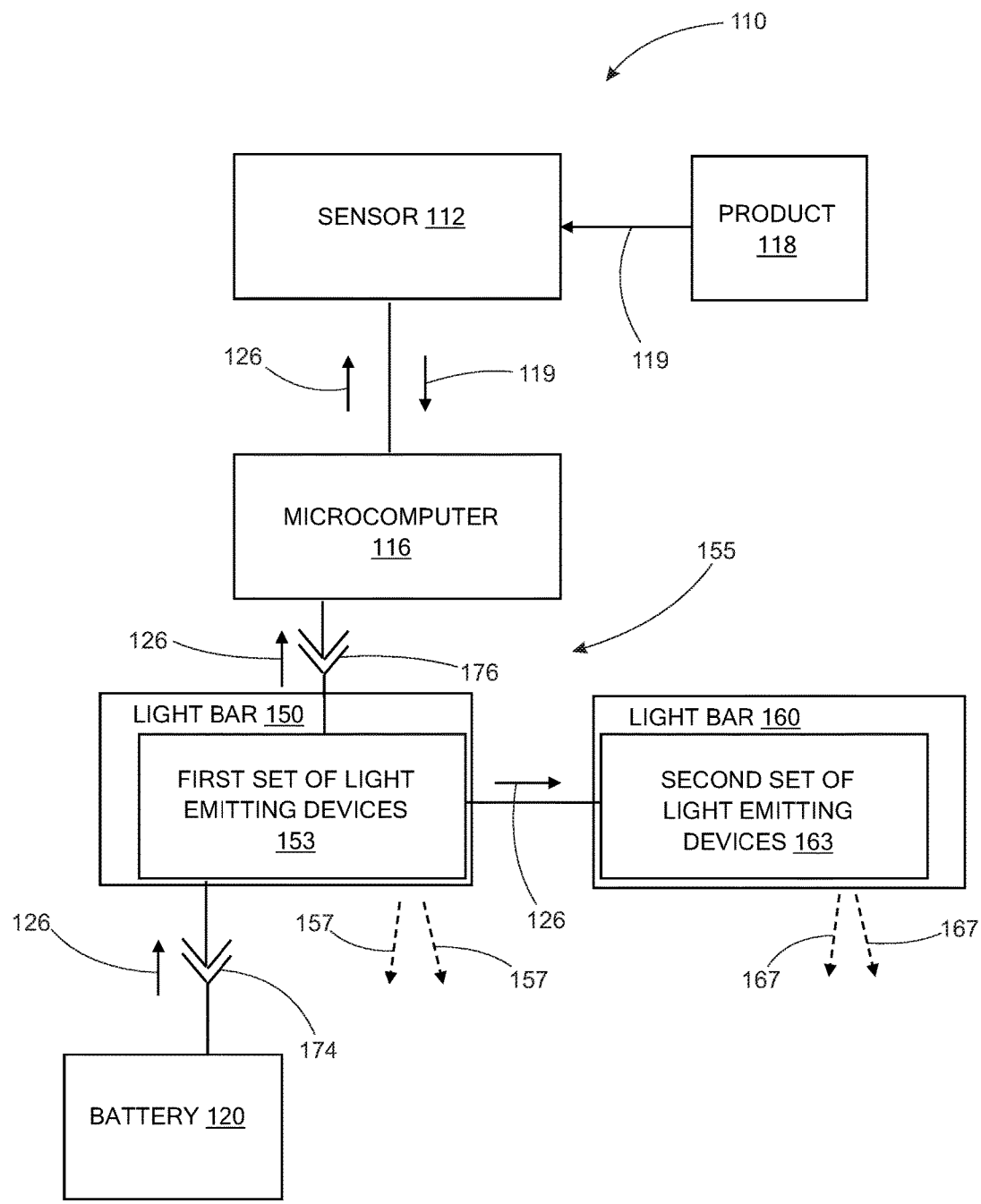
FIG. 6 shows a simplified block diagram of the shopping cart sensor system of FIG. 5.

FIG. 4 through FIG. 6 shows details of shopping cart sensor system 110. FIG. 4 shows a top perspective view of shopping cart sensor system 110 coupled to top rail 182. The remainder of shopping cart 180 is not shown in FIG. 4 for simplicity. FIG. 5 shows a perspective view of shopping cart sensor system 110. FIG. 6 shows a simplified block diagram of shopping cart sensor system 110.

Shopping cart with shopping cart sensor system 108 includes shopping cart 180 and shopping cart sensor system 110. Shopping cart 180 can be many different types and shapes of shopping carts, but, in this embodiment, shopping cart 180 is a type of shopping cart in common use in grocery stores in the United States. Shopping cart 180 includes a shopping basket 184 that rolls along the ground on a set of wheels 192. Set of wheels 192 is coupled to shopping basket 184 for transporting shopping cart 180. Shopping basket 184 includes a bottom panel 185, four side panels and an open top 190. The four side panels include a front panel 186, a first side panel 187, a second side panel 188, and a rear panel 189. Top rail 182 encircles open top 190. Shopping cart 180 is formed of a lattice of metal rails in this embodiment, but this is not meant to be limiting.

Shopping cart sensor system 110 includes frame 130, as shown in FIG. 1 through FIG. 8. Frame 130 is coupled to shopping cart 180 with a first hinge 210 and a second hinge 220. Shopping cart sensor system 110 also includes a sensor 112, a microcomputer 116 enclosed in a microcomputer case 114, a first light bar 150, a second light bar 160, and a battery pack 120, as shown in FIG. 4 through FIG. 6.

Frame 130 is rotatably coupled to top rail 182 of shopping basket 184 such that frame 130 rotates between first position 122 and second position 124. In first position 122, shown in FIG. 2, frame 130 is approximately parallel to plane 106 of top rail 182. In second position 124, shown in FIG. 1 and FIG. 3, frame 130 is approximately perpendicular to plane 106 of top rail 182. Frame 130 rotates between first position 122 and second position 124. Frame 130 is often stored in first position 122 and used in second position 124, but this is not meant to be limiting. In some embodiments frame 130 can rotate to, and be used in, positions other than first position 122 and second position 124.

Frame 130 is an elongate member with a frame first end 132 and a frame second end 133 opposing frame first end 132, as shown in FIG. 3 through FIG. 5 and FIG. 7 and FIG. 8. Frame 130 is formed of a flat strap or bar of rigid or semi-rigid material, in this embodiment, but this is not meant to be limiting. Frame first end 132 is rotatably coupled to top rail 182 with a first hinge 210. Frame second end 133 is rotatably coupled to top rail 182 using a second hinge 220. Frame 130 is rotatably coupled to top rail 182 so that frame 130 extends across shopping basket 184 from side to side like a handle for shopping basket 184. Frame first end 132 is rotatably coupled to a top rail first side section 194 using first hinge 210, as best seen in FIG. 3 and FIG. 4. Frame second end 133 is rotatably coupled to a top rail second side section 196 using second hinge 220. Top rail first side section 194 and top rail second side section 196 are on opposing sides of shopping basket 184. Top rail first side section 194 is at the top of first side panel 187, and top rail second side section 196 is at the top of second side panel 188, as shown in FIG. 2, FIG. 3, and FIG. 4.

Figure 9:
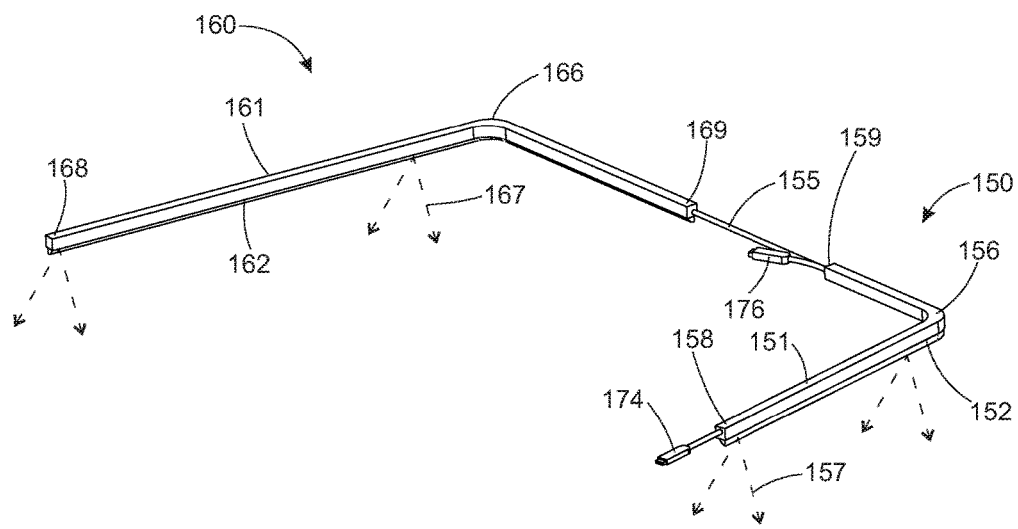
FIG. 9 shows a perspective view of a first and a second light bar.
Figure 10:
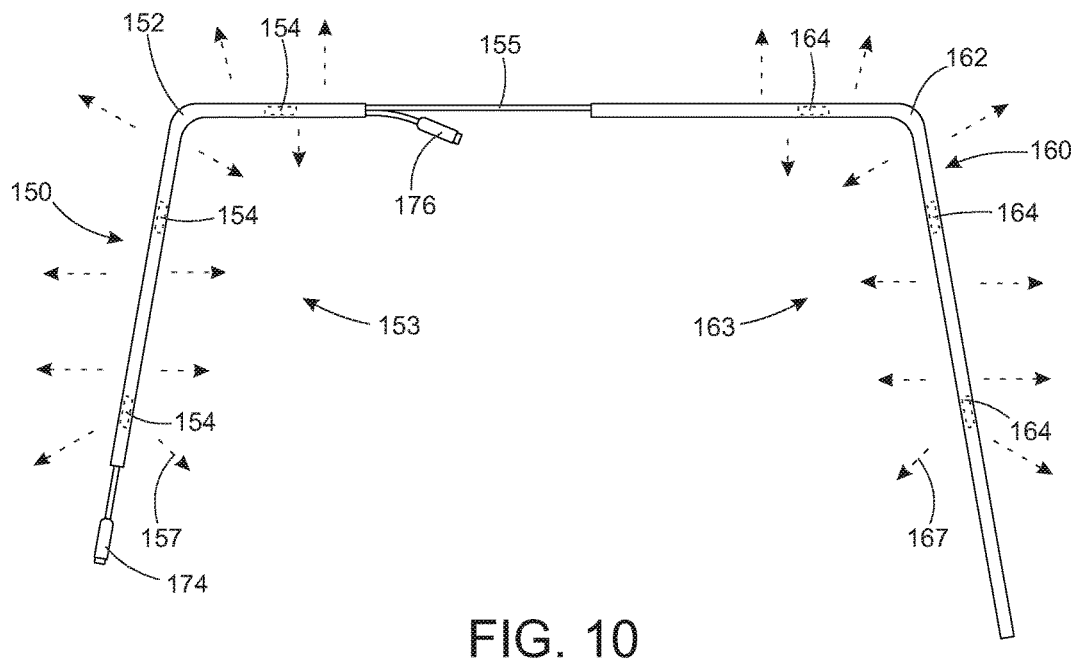
FIG. 10 shows a bottom view of the first and the second light bar of FIG. 9.

Shopping cart sensor system 110 also includes sensor 112, microcomputer 116, battery pack 120, and first and second light bar 150 and 160. First light bar 150 includes a first set of at least one light emitting device 153, and second light bar 160 includes a second set of at least one light emitting device 163, as shown in FIG. 6 and FIG. 10. FIG. 6 shows a simplified block diagram of shopping cart sensor system 110. Sensor 112, microcomputer 116, first and second set of at least one light emitting device 153 and 163, and battery pack 120 are electrically coupled to each other using an electrical wiring harness 155 (FIG. 6, FIG. 9 and FIG. 10). Sensor 112, microcomputer 116, first and second light bar 150 and 160, and battery pack 120 are all mechanically coupled to frame 130 as shown in FIG. 1 through FIG. 5.

Sensor 112 is the element that obtains product information 119 from the items to be purchased in shopping cart 180, such as product 118 shown in FIG. 1, for example. Sensor 112 can be any type of element known now or in the future that can obtain product information from a product. Sensor 112 can be a bar code scanner that scans bar codes or other codes, writing, or images on product 118. Sensor 112 can be a scanner such as a laser scanner or a digital image sensor that captures images of product 118. Sensor 112 can be an electronic sensor that communicates with product 118 to receive radio frequency identification (RFID), near-field communication (NFC), or other type of form of electronic communications from product 118. Or, sensor 112 can be any other type of sensor or element that can be used to obtain product information 119 from or about product 118. Product information 119 can be bar code data, digital images, electronic communications, or other types of data. In the embodiment shown in the figures, sensor 112 is an image sensor that captures digital images of product 118. Product information 119, in this embodiment, is one or more digital images of product 118. Product information 119 is sent to microcomputer 116 for microcomputer 116 to identify product 118 and process the purchase of product 118. Sensor 112 obtains product information 119 from product 118 and sends product information 119 to microcomputer 116. A customer uses shopping cart with sensor system 108 to collect items to be purchased, such as item 118. Once the customer puts product 118 in shopping cart 180, sensor 112 obtains product information 119 automatically from product 118, and any other items to be purchased that the customer puts in shopping cart 180. Microcomputer 116 totals up the amount due and processes the purchase, so that the customer does not have to visit a checkout station to pay for product 118 and/or other items.

Microcomputer 116 is electrically coupled to sensor 112, as shown in FIG. 6. Microcomputer 116 is mechanically coupled to frame 130 via a microcomputer case 114. Microcomputer 116 is enclosed in microcomputer case 114, and microcomputer case 114 is mechanically coupled to frame 130, as shown in FIG. 1 through FIG. 5.

First and second light bar 150 and 160 are mechanically coupled to frame 130, as shown in FIG. 4 and FIG. 5. First light bar 150 includes first set of at least one light emitting device 153. Second light bar 160 includes second set of at least one light emitting devices 163. First and second light bar 150 and 160, and first and second sets of at least one light emitting device 153 and 163 are shown in more detail in FIG. 9 and FIG. 10 and discussed below. First and second sets of at least one light emitting device 153 and 163 receive power 126 from battery 120 via electrical wiring harness 155, as shown in FIG. 6 and FIG. 10.

Battery 120 is mechanically coupled to frame 130, as shown in the figures. Battery 120 is electrically coupled to sensor 112, microcomputer 116, first set of at least one light emitting device 153, and second set of at least one light emitting device 163, as shown in FIG. 6. Battery 120 sends electrical power 126 to sensor 112, microcomputer 116, first set of at least one light emitting device 153, and second set of at least one light emitting device 163 using electrical wiring harness 155.

Figure 7:
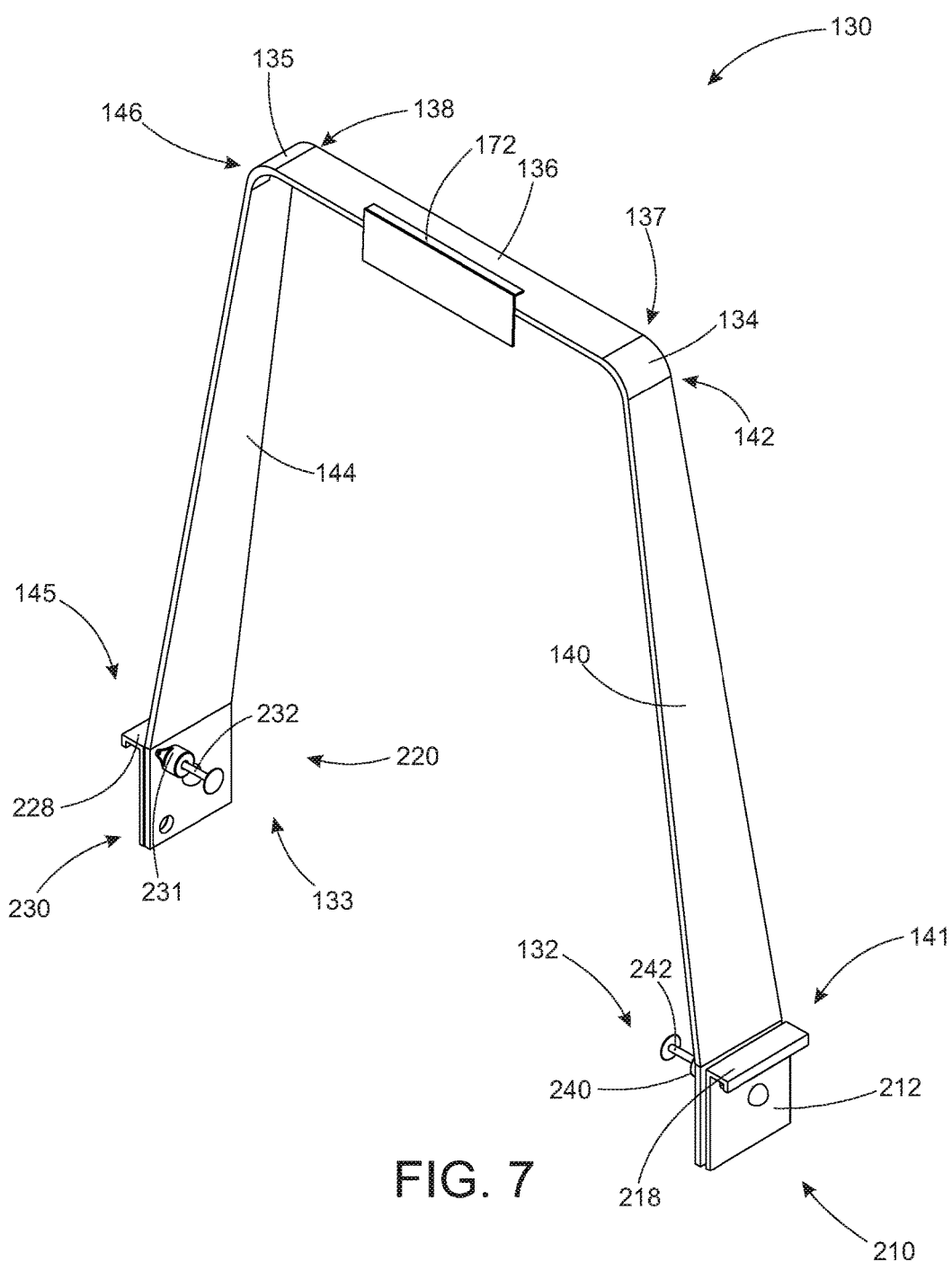
FIG. 7 shows a perspective view of a frame and hinges, with the frame in the second position with respect to the hinges.
Figure 8:
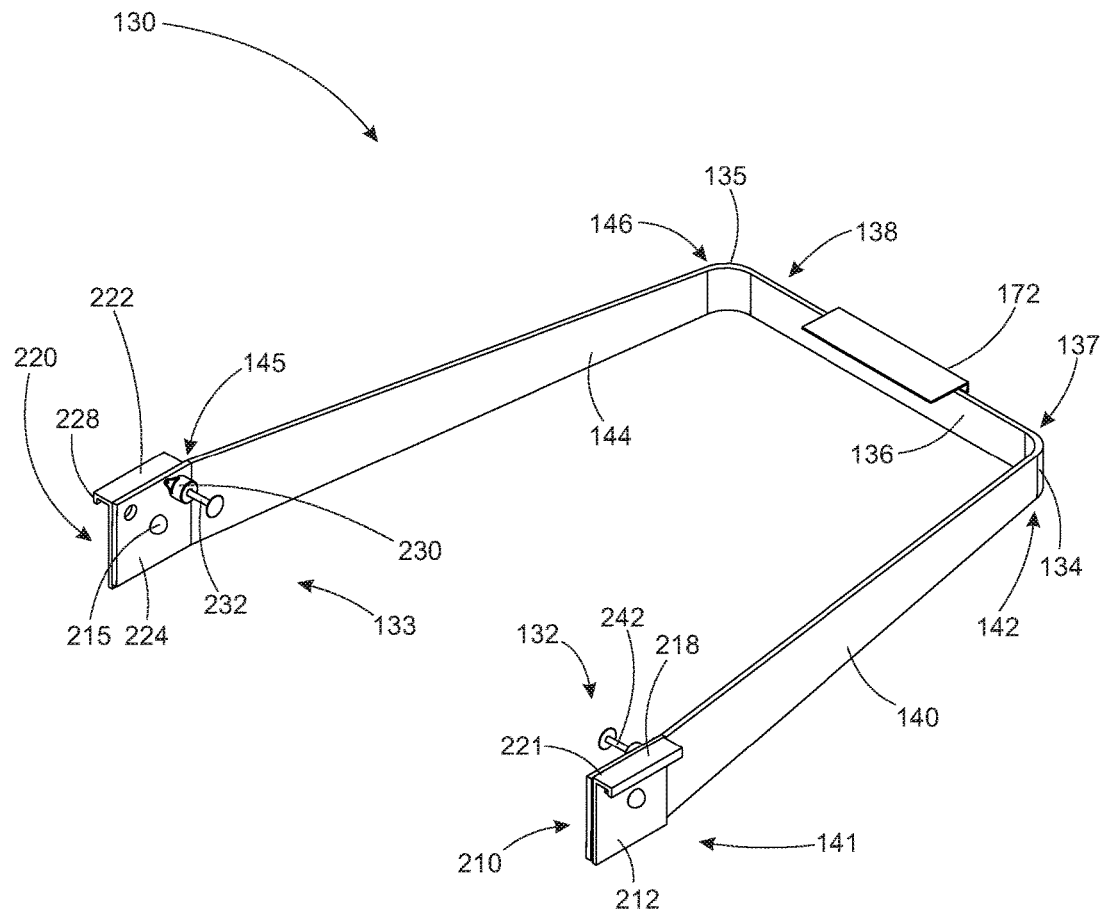
FIG. 8 shows a perspective view of a frame and hinges of FIG. 7, with the frame in the first position with respect to the hinges.

FIG. 7 and FIG. 8 show details of frame 130. FIG. 7 shows a perspective view of frame 130 in second position 124. FIG. 8 shows a perspective view of frame 130 in first position 122. Frame 130 is the skeletal structure that couples sensor 112, microcomputer 116, first and second light bars 150 and 160, and battery 120 to shopping cart 180. Frame 130 in this embodiment is somewhat U-shaped or half-rectangular shaped, with two bends 134 and 135 (FIG. 7 and FIG. 8). Frame 130 is formed of an elongate strap of rigid or semi-rigid material such as plastic, metal, wood, or other material. Bends 134 and 135 divide frame 130 into three sections in this embodiment, as shown in FIG. 7 and FIG. 8. Frame 130 has a frame middle section 136 having a frame middle section first end 137 at bend 134, and a frame middle section second end 138 at bend 135. Frame middle section second end 138 opposes frame middle section first end 137.

Frame 130 has a frame first side section 140 having a frame first side section first end 141 and a frame first side section second end 142 opposing frame first side section first end 141. Frame first side section first end 141 is also first end 132. Frame first side section first end 141 is rotatably coupled to top rail first side section 194 of top rail 182 using hinge 210, as shown in FIG. 1 through FIG. 5. Frame first side section first end 141 is rotatably coupled to top rail first side section 194 so that frame 130 can rotate with respect to shopping basket 184. Frame first side section second end 142 is coupled to frame middle section first end 137 at bend 134.

Frame 130 has a frame second side section 144 having a frame second side section first end 145 and a frame second side section second end 146 opposing frame second side section first end 145. Frame second side section first end 145 is also frame second end 133. Frame second side section first end 145 is rotatably coupled to top rail second side section 196 of top rail 182 using hinge 220, as shown in FIG. 1 through FIG. 5. Frame second side section first end 145 is rotatably coupled to top rail second side section 196 so that frame 130 can rotate with respect to shopping basket 184. Frame second side section second end 146 is coupled to frame middle section second end 138 at bend 135.

With frame first end 132 rotatably coupled to top rail first side section 194, and frame second end 133 rotatably coupled to top rail second side section 196, frame 130 rotatingly extends across shopping basket 184 like a handle. Rotation of frame 130 allows sensor 112 to collect product information 119 from various angles with respect to shopping basket 184 and product 118, for example. Sensor 112 being able to collect product information from various angles with respect to product 118 and/or other items in shopping basket 184 ensures that items will not be missed or mis-identified.

Frame 130 includes a lip 172 in this embodiment. Lip 172 is an elongate protrusion with an L-shaped cross-section (see FIG. 1) that extends from frame middle section 136, as best seen in FIG. 1, FIG. 6 and FIG. 7. Lip 172 catches top bar 182 when frame 130 is in the second position, as can be seen in FIG. 4. Lip 172 supports frame 130 and the components coupled to frame 130 when frame 130 is in first position 122.

Sensor 112, microcomputer case 114, and microcomputer 116 in microcomputer case 114 are mounted to frame middle section 136 in this embodiment, as best seen in FIG. 4 and FIG. 5. Sensor 112, microcomputer case 114, and microcomputer 116 are mechanically coupled to frame middle section 136 in between first light bar 150 and second light bar 160. Battery 120 is mechanically coupled to frame first side section 140 between first light bar 150 and frame first end 132. Battery 120 is electrically coupled to first light bar 150, second light bar 160, microcomputer 116, and sensor 112 using wiring harness 155, see FIG. 5, FIG. 6, FIG. 9 and FIG. 10.

FIG. 9 and FIG. 10 show details of first and second light bar 150 and 160. FIG. 9 shows a perspective view of first light bar 150 and second light bar 160. First light bar 150 is an L-shaped elongate member with a first light bar first end 158, a first light bar elbow 156, and a first light bar second end 159 opposing first light bar first end 158. First light bar 150 is coupled to frame 130 between battery 120 and microcomputer case 114, with first light bar elbow 156 adjacent frame first bend 134, as shown in FIG. 5.

First light bar 150 includes a first light bar frame 151, a first light pipe 152 (FIG. 5 and FIG. 10), and first set of at least one light emitting device 153 (FIG. 10). First light bar frame 151 is a hollow L-shaped elongate member. Electrical wiring harness 155 runs through hollow first light bar frame 151 and extends from either end, as shown in FIG. 9. Electrical wiring harness 155 extends from first light bar frame 151 at first light bar first end 158 and is coupled to a first electrical connector 174. First electrical connector 174 is coupled to first light bar frame first end 158 using electrical wiring harness 155. First electrical connector 174 electrically couples electrical wiring harness 155 to battery 120, as shown in FIG. 5 and FIG. 6. Wiring harness 155 is partially encased in first light bar frame 151. Electrical wiring harness 155 extends from first light bar frame 151 at first light bar second end 159, where a part of wiring harness 155 extends into second light bar 160, and a part of electrical wiring harness 155 is coupled to a second electrical connector 176. Second electrical connector 176 is coupled to first light bar frame second end 159 with electrical wiring harness 155. Second electrical connector 176 electrically couples electrical wiring harness 155 to microcomputer 116, as shown in FIG. 6.

First light pipe 152 is an elongate member formed of an optically transmitting material. First light pipe 152 is about the same size and length as first light bar frame 151 and is coupled to first light bar frame 151 long the length of first light bar frame 151, as shown in the figures. First light pipe 152 runs adjacent first light bar frame 151, as seen in FIG. 5, FIG. 9, and FIG. 10. First set of at least one light emitting device 153 is a set of at least one device that emits light 157 as shown in FIG. 4, FIG. 5, FIG. 6, FIG. 9, and FIG. 10. First set of at least one light emitting device 153 is optically coupled to first light pipe 152 so that light 157 enters first light pipe 152. Light 157 travels along first light pipe 152 until it is emitted from first light pipe 152, as shown in FIG. 5 and FIG. 9. In this embodiment, first set of at least one light emitting device 153 includes three light emitting devices 154, as shown in FIG. 10. Light emitting devices 154 are each embedded in first light pipe 152, in this embodiment, but this is not mean to be limiting. In some embodiments, light emitting devices 154 are not embedded in first light pipe 152, but instead emit light 157 into first light pipe 152 from outside of first light pipe 152. In the embodiment shown in the figures, light emitting devices 154 are embedded in first light pipe 152, with power and signal wires from electrical wiring harness 155 running from wiring harness 155 into first light pipe 152 to light emitting devices 154. Light 157 is emitted from light emitting devices 154 into first light pipe 152. Light 157 bounces around in first light pipe 152 until it is emitted from first light pipe 152. First light pipe 152 is used to distribute and emit light 157 along the length of first light bar 150. Light 157 can be used for several purposes. For example, light 157 is used to illuminate items to be purchased in shopping cart 180, such as item 118 shown in FIG. 1. Light emitting devices 154 can be chosen such that light 157 has a spectrum and intensity that makes it easy for sensor 112 to obtain product information 119 from product 118 when product 118 is illuminated with light 157. Light 157 can also be used to indicate the status of shopping cart scanner system 110. Different colors of light can be used to tell the user when shopping cart scanner system 110 is turned on, if the operation of shopping cart scanner system 110 is ok, or if there is an issue with the operation of shopping cart scanner system 110, for example. In some embodiments, light 157 is used to provide other information to the user.

Second light bar 160 is an L-shaped elongate member with a second light bar first end 168, a second light bar elbow 166, and a second light bar second end 169 opposing second light bar first end 168. Second light bar 160 is coupled to frame 130 between sensor 112 and frame second end 133, with second light bar elbow 166 adjacent frame second bend 135, as shown in FIG. 4.

Referring back to FIG. 9 and FIG. 10, second light bar 160 includes a second light bar frame 161, a second light pipe 162, and second set of at least one light emitting device 163. Second light bar frame 161 is a hollow L-shaped elongate member. Electrical wiring harness 155 is partially encased in hollow second light bar frame 161. Electrical wiring harness 155 runs through second light bar frame 161 and extends from second light bar frame 161 at second light bar second end 169, as shown in FIG. 9. Electrical wiring harness 155 extends from second light bar frame 161 at second light bar second end 169 into first light bar 150.

Second light pipe 162 is an elongate member formed of an optically transmitting material. Second light pipe 162 is about the same size and length as second light bar frame 161 and is coupled to second light bar frame 161 long the length of second light bar frame 161, as shown in the figures. Second light pipe 162 runs adjacent second light bar frame 161, as seen in FIG. 4 and FIG. 9. Second set of at least one light emitting device 163 is a set of at least one device that emits light 167. Second set of at least one light emitting device 163 is optically coupled to second light pipe 162 so that light 167 enters second light pipe 162. Light 167 travels along second light pipe 162 until it is emitted from second light pipe 162, as shown in FIG. 4 and FIG. 9. In this embodiment, second set of at least one light emitting device 163 includes three light emitting devices 164, as shown in FIG. 10. Light emitting devices 164 are each embedded in second light pipe 162, in this embodiment, but this is not mean to be limiting. In some embodiments, light emitting devices 164 are not embedded in first light pipe 162, but are optically coupled to second light pipe 162 and emit light 167 into second light pipe 162 from outside of second light pipe 162. In the embodiment shown in the figures, light emitting devices 164 are embedded in second light pipe 162, with power and signal wires from electrical wiring harness 155 running from wiring harness 155 into second light pipe 162 to light emitting devices 164. Light 167 is emitted from light emitting devices 164 into second light pipe 162. Light 167 bounces around in second light pipe 162 until it is eventually emitted from second light pipe 162. Second light pipe 162 is used to distribute and emit light 167 along the length of second light bar 160. Light 167 is used to illuminate items to be purchased in shopping cart 180, such as item 118 shown in FIG. 1, or to indicate the status of shopping cart scanner system 110, for example but not by way of limitation. Light emitting devices 164 can be chosen such that light 167 has a spectrum and intensity that makes it easy for sensor 112 to obtain product information 119 from product 118.

Frame 130 is rotatably coupled to shopping basket 184 of shopping cart 180 so that sensor 112 can scan items in shopping basket 184 from different angles and obtain product information 119 from product 118, as well as any other items to be purchased that may be in shopping basket 184. In the embodiment shown in the figures, sensor 112 is an image sensor that captures digital images of product 118 and uses the digital images to identify product 118 and obtain product information 119 for product 118. Having frame 130 able to rotate with respect to shopping basket 184 allows sensor 112 to capture digital images of product 118 or other items in shopping basket 184 from different views as frame 130 rotates.

Figure 11:
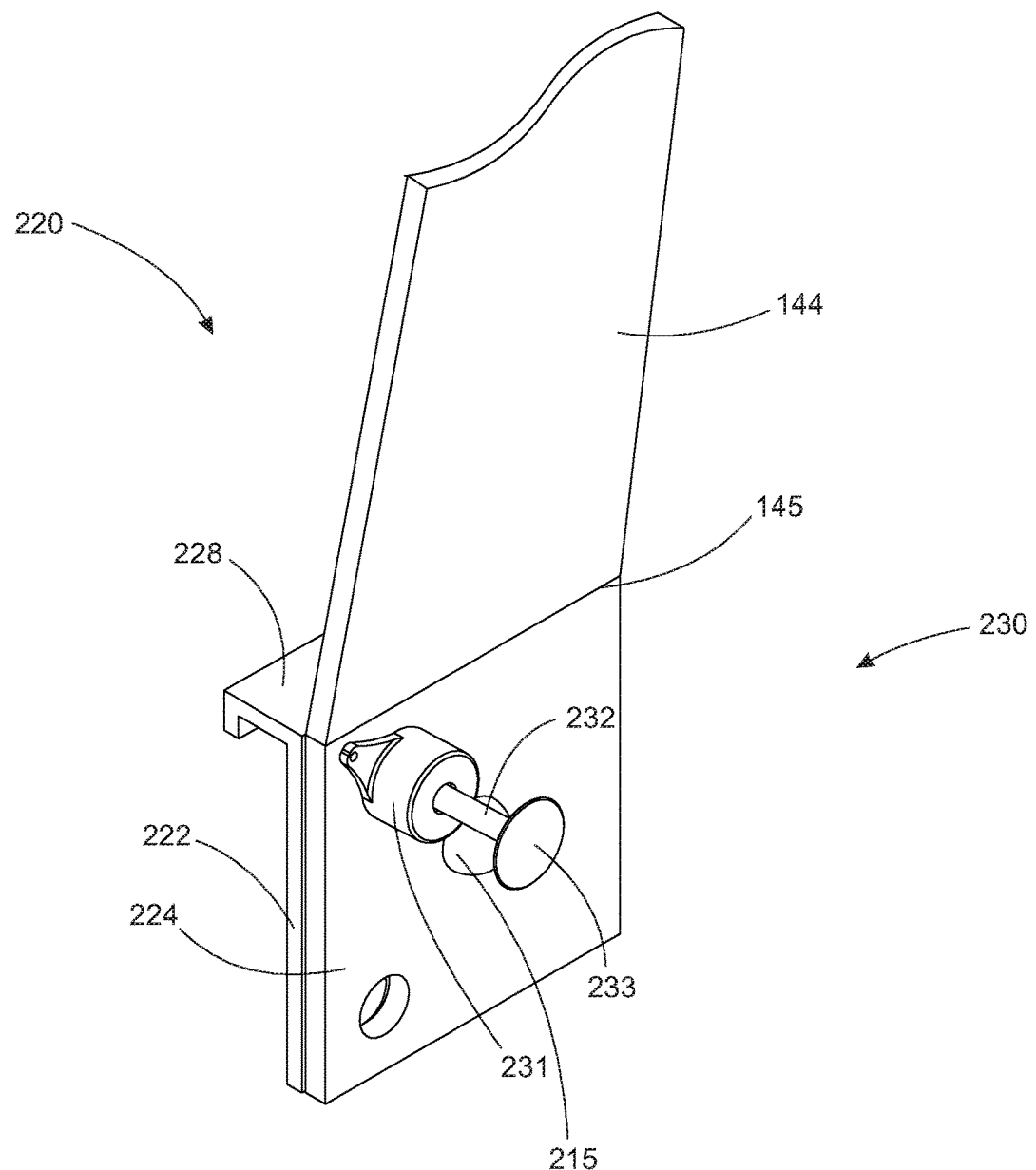
FIG. 11 shows a close up view of a hinge.
Figure 12:
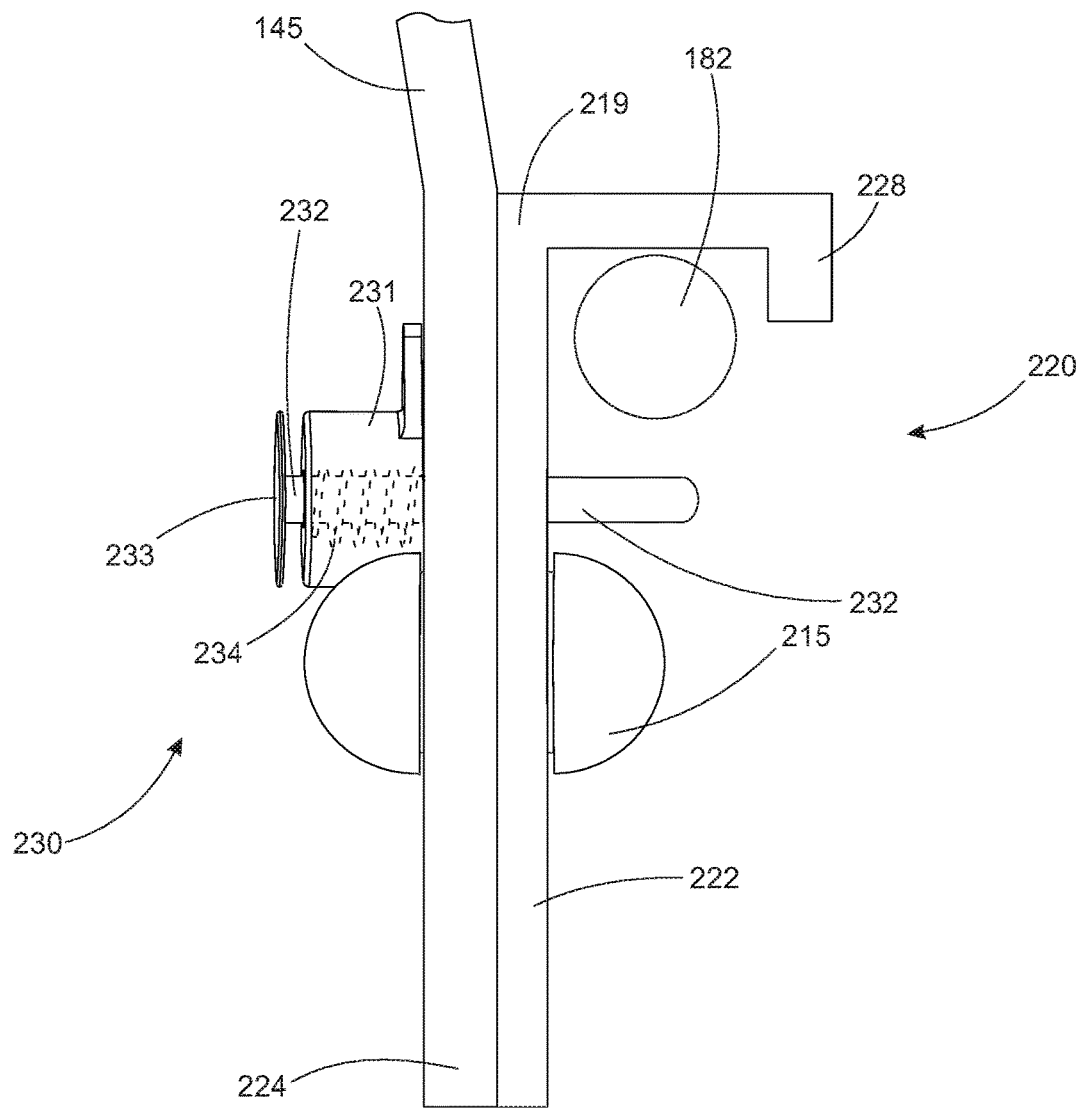
FIG. 12 shows a side view of the hinge of FIG. 11.
Figure 13:
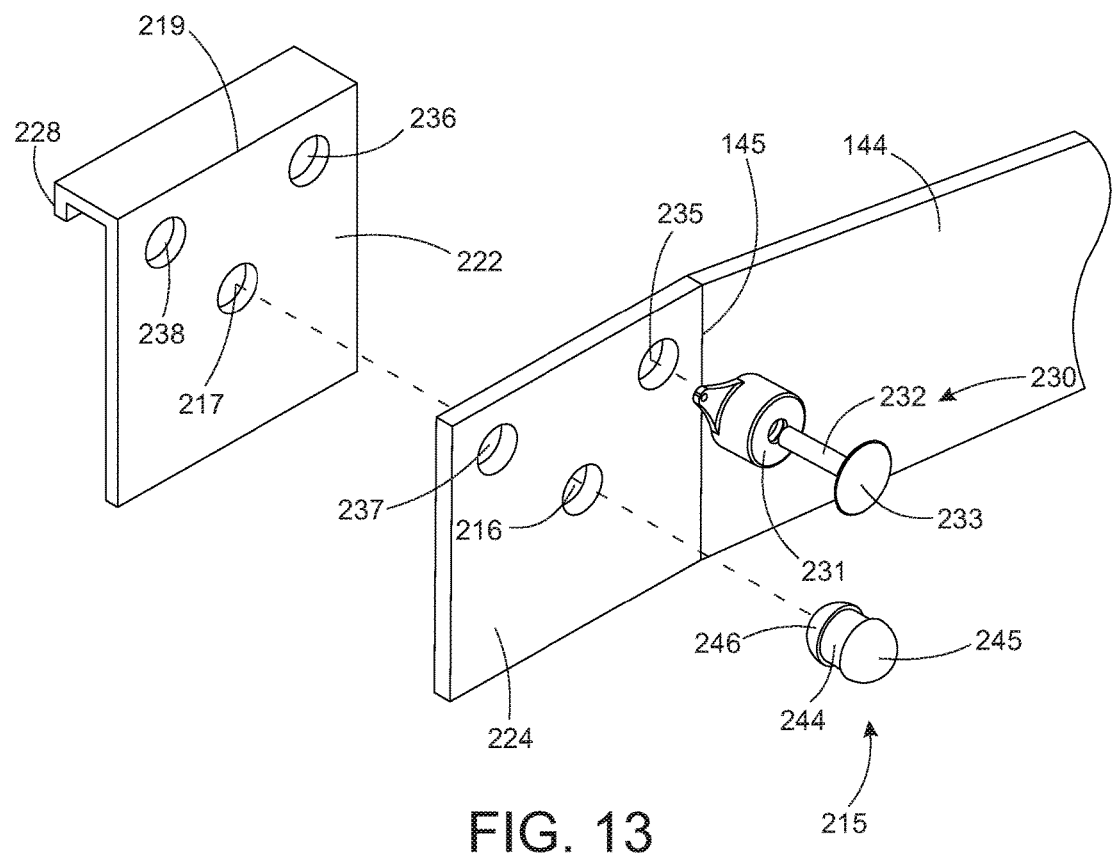
FIG. 13 shows an exploded view of the hinge of FIG. 11.

Frame 130 is rotatably coupled to shopping cart 180 using hinges 210 and 220. FIG. 11, FIG. 12, and FIG. 13 show details of hinge 220. Hinge 210 is a mirror image of hinge 220 so is not shown in detail. FIG. 11 is a close up front perspective view of hinge 220 coupled to frame second side section 144, with frame second side section 144 in second position 124. FIG. 12 shows a side view of hinge 220 of FIG. 11, which hinge 220 hanging from top rail 182. FIG. 13 shows an exploded view of hinge 220, with frame second side section 144 in first position 122.

Hinge 210 includes a first support plate 214 and a first mounting plate 212, as best seen in FIG. 5 and FIG. 8. First support plate 214 is a rectangular plate fixedly coupled to frame first side section first end 141. First mounting plate 212 is a rectangular plate that is approximately the same size and shape as first support plate 214. First mounting plate 212 has a first hook 218 coupled to a top edge 221 (FIG. 8) of first mounting plate 212. Hook 218 couples hinge 210 to shopping cart 180. Hook 218 hangs from top rail 182 of shopping basket 184 to couple hinge 210 to shopping cart 180, as seen in FIG. 4, for example. In this embodiment, hook 218 is magnetic, so not only does hook 218 hang on top rail 182, hook 218 is magnetically attracted to top rail 182 to help couple hook 210 to top rail 182 of shopping basket 184.

Similarly, hinge 220 includes a second support plate 224 and a second mounting plate 222, as best seen in FIG. 5 and FIG. 8, and FIG. 11 through FIG. 13. Second support plate 224 is a rectangular plate coupled to frame second side section first end 145. Second mounting plate 222 is a rectangular plate that is approximately the same size and shape as first support plate 224. Second mounting plate 222 has a second hook 228 coupled to a top edge 219 of second mounting plate 222, as shown in FIG. 12 and FIG. 13. Hook 228 couples hinge 220 to shopping cart 180, as shown in FIG. 12, for example. Hook 228 hangs from top rail 182 of shopping basket 184 to couple hinge 220 to shopping cart 180. In this embodiment, hook 228 is magnetic, so not only does hook 228 hang on top rail 182, hook 228 is magnetically attracted to top rail 182 to help couple hook 220 to top rail 182 of shopping basket 184.

Second support plate 224 and second mounting plate 222 are rotatably coupled to each other using a pivot bolt 215, as shown in FIG. 12 through FIG. 13. Pivot bolt 215 extends through a first pivot bolt hole 216 in second support plate 224, and a second pivot bolt hole 217 in second mounting plate 222, as seen in FIG. 13. Pivot bolt 215 includes a bolt shank 244 with a head 245 and 246 on each end of shank 244. Pivot bolt 215 couples second mounting plate 222 to second support plate 224 by capturing second support plate 224 and second mounting plate 222 on shank 244 between heads 245 and 246, while allowing second support plate 224 and second mounting plate 222 to rotate with respect to each other on shank 244.

Second mounting plate 222 is removeably coupled to shopping basket 184, and does not rotate with respect to shopping basket 184. Second support plate 224 is fixedly coupled to frame second side section first end 144 such that second support plate 224 does not rotate with respect to frame second side section first end 145. Second support plate 224 rotates with respect to second mounting plate 222 on pivot bolt 215, which provides the means for frame 130 to rotate with respect to shopping basket 184. Frame 130 is fixedly coupled to second support plate 224 such that when second support plate 224 rotates with respect to second mounting plate 222, frame 130 rotates with respect to second mounting plate 222 and shopping basket 184.

First hinge 210 is similarly rotatable. First mounting plate 212 is rotatably coupled to first support plate 214 with a pivot bolt. First mounting plate 212 is removeably coupled to shopping basket 184, but first mounting plate 212 does not rotate with respect to shopping basket 184. First support plate 214 is fixedly coupled to frame first side section first end 141 such that first support plate 214 does not rotate with respect to frame first side section first end 141. First support plate 214 rotates with respect to first support plate 212 on the pivot bolt, which provides the means for frame 130 to rotate with respect to shopping basket 184.

First hinge 210 and second hinge 220 each include a release pin mechanism that locks frame 130 in the first and the second positions 122 and 124. First hinge 210 includes a first release pin mechanism 240. Second hinge 220 includes a second release pin mechanism 230. First and second release pin mechanisms 230 and 240 are shown in FIG. 4, FIG. 5, FIG. 7, and FIG. 8. Details of second hinge 220 and second release pin mechanism 230 are shown in FIG. 11, FIG. 12, and FIG. 13 and described herein. First hinge 210 and first release pin mechanism 240 are a mirror image of second hinge 220 and second release pin mechanism 230.

Referring to FIG. 11 through FIG. 13, release pin mechanism 230 includes a pin 232 having a pin head 233, a pin housing 231 and a spring 234. Pin 232 extends through and is held by housing 231. Pin 232 extends out of either end of housing 231, as shown in FIG. 12. Spring 234 biases pin head 233 against housing 231.

Second support plate 224 has three holes: first pivot bolt hole 216, and two pin holes 235 and 237. Second mounting plate 222 has three holes: second pivot bolt hole 217, and two receiver holes 236 and 238. Pin housing 231 is coupled to second support plate 224 over pin hole 235, as shown in FIG. 13. Spring 234 biases pin head 233 against pin housing 231 and pin 232 through pin hole 235, as shown in FIG. 12 and FIG. 13. When pin 232 is extending through pin hole 235 of second support plate 224 (see FIG. 12 for example), pin 232 can extend through either receiver hole 236 or receiver hole 238 of second mounting plate 222 to lock second support plate 224 and frame 130 in either first position 122 or second position 124.

When frame 130 is in first position 122, as shown in FIG. 2, FIG. 4, FIG. 5, FIG. 8, and FIG. 13, pin 232 extends through pin hole 235 and receiver hole 236. Pin 232 extending through receiver hole 236 locks second support plate 224 from rotating with respect to second mounting plate 222, which locks frame 130 from rotating with respect to shopping basket 184 and shopping cart 180.

When frame 130 is in second position 124, as shown in FIG. 1, FIG. 3, FIG. 7, FIG. 11 and FIG. 12, pin 232 extends through pin hole 235 and receiver hole 238. Pin 232 extending through receiver hole 238 locks second support plate 224 from rotating with respect to second mounting plate 222, which locks frame 130 from rotating with respect to shopping basket 184 and shopping cart 180.

Pin 232 extending through first or second receiver hole 236 or 238 also helps lock hinge 220 to shopping basket 184 of shopping cart 180. When pin 232 extends through either first or second receiver hole 236 or 238, pin 232 locks top rail 182 in hook 228, as shown in FIG. 12. This helps lock hinge 220 to top rail 182, shopping basket 184, and shopping cart 180.

When pin 232 is extending through either first receiver hole 236 or second receiver hole 238, frame 130 is locked from rotating with respect to shopping cart 180. Second support plate 224 is prevented from rotating with respect to second mounting plate 222 in response to pin 232 extending through pin hole 235 and either first receiver hole 236 or second receiver hole 238. First hinge 210 and first release pin mechanism 240 is a mirror image of second hinge 220 and second release mechanism 240, so the description is similar. First release pin mechanism 240 includes a second pin 242, which extends through a pin hole (not shown) in first support plate 214 into one of two receiver holes (not shown) in first mounting plate 212.

When it is desired to rotate frame 130, the user pulls pin 232 and 242, withdrawing pin 232 from either first or second receiver hole 236 or 238, and withdrawing pin 242 from its corresponding receiver hole. With pin 232 and 242 withdrawn, first support plate 214 can rotate with respect to first mounting plate 212, second support plate 224 can rotate with respect to second mounting plate 222, and frame 130 can rotate with respect to shopping basket 184 of shopping cart 180. It is desirable to rotate frame 130 with respect to shopping basket 184 for many reasons. Frame 130 is often stored in first position 122, and used in second position 124. Second position 124 of frame 130 gives sensor 112 a good view of item 118 in shopping basket 184, for example. It may be desirable to rotate frame 130 to move frame 130 from first position 122 to second position 124, for example. Or, the user may desire to move frame 130 into a position other than first position 122 or second position 124. This may be desired if sensor 112 is having trouble obtaining product information 119 from an item in shopping cart 180, for example. Withdrawing pin 232 from either receiver hole 236 or 238 and withdrawing pin 242 from its receiver holes allows rotation of frame 130.

It has been shown how shopping cart sensor system 110 provides a means to collect product information 119 from items to be purchased in shopping cart 180. Frame 130 supports sensor 112 microcomputer 116, and first and second light bar 150 and 160. First and second hinge 210 and 220 couple frame 130 to shopping basket 184 of shopping cart 180, and allow frame 130 to rotate with respect to shopping basket 184, so that sensor 112 can collect product information 119 from items in shopping basket 184, such as product 118. First and second hinge 210 and 220 also provide a means to lock frame 130 in a first position 122 or a second position 124 with respect to shopping basket 184. First and second light bar 150 and 160 provide illumination to help sensor 112 collect product information 119 from product 118 and other items in shopping cart 180. Product information 119 is used to ring up the items a customer wished to purchase, so the customer does not have to visit a checkout station to have their items rung up.

Figure 14:
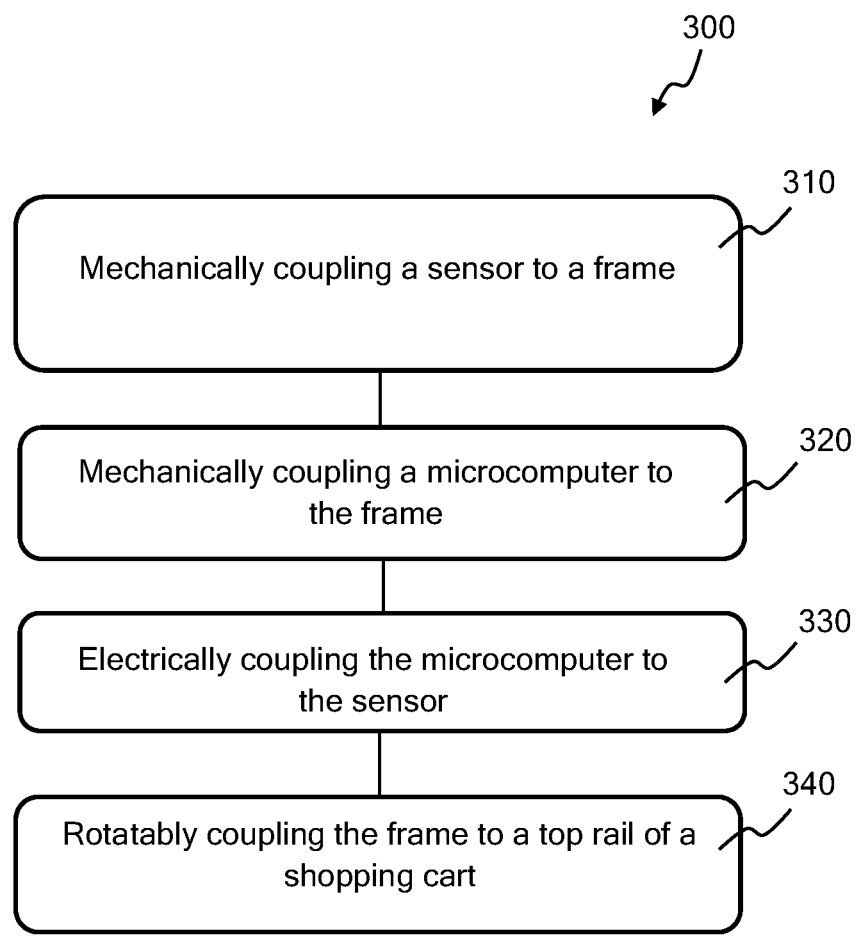
FIG. 14 illustrates a method of assembling a shopping cart with shopping cart sensor system.

FIG. 14 illustrates a method 300 of assembling a shopping cart with sensor system. Method 300 includes an act 310 of mechanically coupling a sensor to a frame. The sensor senses product information of a product in the shopping cart. The sensor can be a scanner, an image sensor, or any other electronic device that can obtain product information from the product.

Method 300 also includes an act 320 of mechanically coupling a microcomputer to the frame. In some embodiments, mechanically coupling the microcomputer to the frame includes enclosing the microcomputer in a microcomputer case, and mechanically coupling the microcomputer case to the frame.

Method 300 also includes an act 330 of electrically coupling the microcomputer to the sensor. The microcomputer receives the product information from the sensor so that the microcomputer can ring up the sale of the product for the customer.

Method 300 also includes an act 340 of rotatably coupling the frame to a top rail of a shopping cart. The frame is coupled to the top rail of the shopping cart such that the frame rotates from a first position to a second position. The frame is parallel to a plane of the top rail in the first position, and the frame extends perpendicular to the plane of the top rail in the second position. The frame is often stored in the first position, and used to scan items in the shopping cart in the second position, but this is not meant to be limiting. The frame can be stored and used in many different positions.

In some embodiments, act 340 of rotatably coupling the frame to the top rail of the shopping cart includes an act of mechanically coupling a rotating first hinge to a first end of the frame. In some embodiments, rotatably coupling the frame to the top rail of the shopping cart includes an act of hanging a first hook of the first hinge on a top rail first side section, wherein the first hook is magnetic. In some embodiments, rotatably coupling the frame to the top rail of the shopping cart includes an act of mechanically coupling a rotating second hinge to a second end of the frame. In some embodiments, rotatably coupling the frame to the top rail of the shopping cart includes an act of hanging a second hook of the second hinge to a top rail second side section, wherein the second hook is magnetic.

In some embodiments, method 300 includes mechanically coupling a first light bar to the frame at a first frame elbow. In some embodiments, method 300 includes mechanically coupling a second light bar to the frame at a second frame elbow. In some embodiments, act 310 of mechanically coupling the sensor to the frame comprises mechanically coupling the sensor to the frame between the first light bar and the second light bar. In some embodiments, method 300 includes mechanically coupling a battery to the frame between the frame first end and the first light bar. In some embodiments, method 300 includes electrically coupling the battery to the sensor, the microcomputer, the first light bar and the second light bar.

In some embodiments, act 320 of mechanically coupling the microcomputer to the frame includes mounting the microcomputer in a microcomputer case. In some embodiments, act 320 of mechanically coupling the microcomputer to the frame includes mechanically coupling the microcomputer case to the frame between the first light bar and the second light bar.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above.

The invention claimed is:

1. A shopping cart sensor system comprising:
a frame, wherein the frame is a first elongate member comprising two bends, wherein the two bends divide the frame into three sections, wherein the three sections comprise:
a frame middle section, wherein the frame middle section comprises a frame middle section first end and a frame middle section second end opposing the frame middle section first end;
a frame first side section, wherein the frame first side section comprises a frame first side section first end and a frame first side section second end, wherein the frame first side section second end is coupled to the frame middle section first end; and a frame second side section, wherein the frame second side section comprises a frame second side section first end and a frame second side section second end, wherein the frame second side section second end is coupled to the frame middle section second end;

a sensor mechanically coupled to the frame;

a microcomputer enclosed in a microcomputer case, wherein the microcomputer case is mechanically coupled to the frame, and wherein the microcomputer is electrically coupled to the sensor; and a battery pack mechanically coupled to the frame and electrically coupled to the microcomputer;

a first and a second light bar coupled to the frame;

wherein the sensor obtains product information from a product and sends the product information to the microcomputer.

2. The shopping cart sensor system of claim 1, wherein the first light bar comprises:

a first light bar frame, wherein the first light bar frame is a first hollow L-shaped elongate member;

a first light pipe coupled to the first light bar frame, wherein the first light pipe is a second elongate member formed of an optically transmitting material;

a first set of at least one light emitting device optically coupled to the first light pipe; and an electrical wiring harness at least partially encased in the first light bar frame.

3. The shopping cart sensor system of claim 2, wherein the second light bar comprises:

a second light bar frame, wherein the second light bar frame is a second hollow L-shaped elongate member;

a second light pipe coupled to the second light bar frame, wherein the second light pipe is a third elongate member formed of
the optically transmitting material; and a second set of at least one light emitting device optically coupled to the second light pipe;

wherein the electrical wiring harness is at least partially encased in the second light bar frame.

4. The shopping cart sensor system of claim 3, wherein the first light bar further comprises:

a first electrical connector coupled to a first light bar frame first end, wherein the first electrical connector couples to the battery pack; and a second electrical connector coupled to a first light bar frame second end, wherein the second electrical connector couples to the microcomputer.

5. The shopping cart sensor system of claim 3, wherein a first light bar elbow is adjacent a first frame bend, and wherein a second light bar elbow is adjacent a second frame bend.

6. The shopping cart sensor system of claim 1, further comprising:

a first hinge, wherein the first hinge comprises:
a first support plate coupled to the frame first side section first end; and
a first mounting plate rotatably coupled to the first support plate; and a second hinge, wherein the second hinge comprises:
a second support plate coupled to the frame second side section first end; and
a second mounting plate rotatably coupled to the second support plate.

7. The shopping cart sensor system of claim 6, wherein the first hinge further comprises:

a pivot bolt, wherein the pivot bolt extends through a first pivot bolt hole in the first support plate and a second pivot bolt hole in the first mounting plate, wherein the first mounting plate and the first support plate both rotate about the pivot bolt;

at least one hook coupled to the first mounting plate, wherein the at least one hook is configured to couple the first hinge to a shopping cart; and a release pin mechanism comprising a pin and a spring, wherein the release pin mechanism is coupled to the first support plate, and wherein the first support plate is prevented from rotating with respect to the first mounting plate in response to the pin extending through both a pin hole in the first support plate and a receiver hole in the first mounting plate.

8. The shopping cart sensor system of claim 1, wherein the sensor is an image sensor.

9. A shopping cart with a shopping cart sensor system comprising:

a shopping cart comprising:
a shopping basket comprising a bottom panel, four side panels, an open top, and a top rail that encircles the open top; and
a set of wheels coupled to the shopping basket for transporting the shopping cart; and a shopping cart sensor system comprising:
a frame, wherein the frame is a first elongate member comprising:
a frame first end rotatably coupled to the top rail; and
a frame second end opposing the frame first end and rotatably coupled to the top rail;
wherein the frame rotates from a first position to a second position, and wherein the frame is parallel to a plane of the top rail in the first position, and wherein the frame extends perpendicular to the plane of the top rail in the second position;

a sensor mechanically coupled to the frame;

a microcomputer enclosed in a microcomputer case, wherein the microcomputer case encloses the microcomputer and is mechanically coupled to the frame, and wherein the microcomputer is electrically coupled to the sensor; and a battery pack mechanically coupled to the frame and electrically coupled to the microcomputer;

wherein the sensor obtains product information from a product in the shopping basket and sends the product information to the microcomputer.

10. The shopping cart with a shopping cart sensor system of claim 9, wherein the frame first end is rotatably coupled to a top rail first side section with a first hinge, and wherein the frame second end is rotatably coupled to a top rail second side section opposing the top rail first side section with a second hinge.

11. The shopping cart with a shopping cart sensor system of claim 10, wherein the first hinge comprises:

a first support plate coupled to the frame first end;

a first mounting plate rotatably coupled to the first support plate;

a pivot bolt, wherein the pivot bolt extends through a first pivot bolt hole in the first support plate and a second pivot bolt hole in the first mounting plate, wherein the first mounting plate and the first support plate both rotate about the pivot bolt;

at least one hook coupled to the first mounting plate, wherein the at least one hook is configured to couple the first hinge to the top rail first side section; and a release pin mechanism comprising a pin, wherein the release pin mechanism is coupled to the first support plate, and wherein the first support plate is prevented from rotating with respect to the first mounting plate in response to the pin extending through both a pin hole in the first support plate and a pin receiver hole in the first mounting plate.

12. The shopping cart with a shopping cart sensor system of claim 11, further comprising a first and a second light bar coupled to the frame.

13. The shopping cart with a shopping cart sensor system of claim 12, wherein the first light bar comprises:
   a first light bar frame, wherein the first light bar frame is a first hollow L-shaped elongate member;
   a first light pipe coupled to the first light bar frame, wherein the first light pipe is a second elongate member formed of an optically transmitting material;
   a first set of at least one light emitting device optically coupled to the first light pipe; and
   an electrical wiring harness at least partially encased in the first light bar frame.

14. A method of assembling a shopping cart with a shopping cart sensor system comprising:
   mechanically coupling a sensor to a frame, wherein the sensor senses product information of a product in a shopping cart;
   mechanically coupling a microcomputer to the frame;
   electrically coupling the microcomputer to the sensor, wherein the microcomputer receives the product information from the sensor; and
   rotatably coupling the frame to a top rail of a shopping cart, wherein the frame rotates from a first position to a second position, wherein the frame is parallel to a plane of the top rail in the first position, and wherein the frame extends perpendicular to the plane of the top rail in the second position.

15. The method of claim 14, wherein the rotatably coupling the frame to the top rail of the shopping cart comprises:
   mechanically coupling a rotating first hinge to a first end of the frame;
   hanging a first hook of the first hinge on a top rail first side section, wherein the first hook is magnetic;
   mechanically coupling a rotating second hinge to a second end of the frame; and
   hanging a second hook of the second hinge to a top rail second side section, wherein the second hook is magnetic.

16. The method of claim 15, further comprising:
   mechanically coupling a first light bar to the frame at a first frame elbow; and
   mechanically coupling a second light bar to the frame at a second frame elbow.

17. The method of claim 16, wherein the mechanically coupling the sensor to the frame comprises mechanically coupling the sensor to the frame between the first light bar and the second light bar.

18. The method of claim 17, further comprising:
   mechanically coupling a battery to the frame between the frame first end and the first light bar; and
   electrically coupling the battery to the sensor, the microcomputer, the first light bar and the second light bar.

19. The method of claim 18, wherein the mechanically coupling the microcomputer to the frame comprises:
   mounting the microcomputer in a microcomputer case; and
   mechanically coupling the microcomputer case to the frame between the first light bar and the second light bar.

* * * * *